(12) United States Patent
Hirayama et al.

(10) Patent No.: US 7,863,371 B2
(45) Date of Patent: Jan. 4, 2011

(54) RUBBER COMPOSITION FOR INNER LINER AND TIRE COMPRISING THE SAME

(75) Inventors: Tomoaki Hirayama, Kobe (JP); Takao Wada, Kobe (JP); Mamoru Uchida, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 0 days.

(21) Appl. No.: 11/365,862

(22) Filed: Mar. 2, 2006

(65) Prior Publication Data

US 2006/0205858 A1 Sep. 14, 2006

(30) Foreign Application Priority Data

Mar. 8, 2005 (JP) ............... 2005-064232

(51) Int. Cl.
*B60C 1/00* (2006.01)
*C08K 3/36* (2006.01)

(52) U.S. Cl. ............ 524/493; 524/492; 524/572

(58) Field of Classification Search ........... 524/492, 524/493, 495, 496, 572; 525/333.2
See application file for complete search history.

(56) References Cited

U.S. PATENT DOCUMENTS

| 3,873,489 | A | * | 3/1975 | Thurn et al. ......... 524/262 |
| 4,121,946 | A | * | 10/1978 | Chuiko et al. ......... 106/481 |
| 4,229,333 | A | | 10/1980 | Wolff et al. |
| 5,396,940 | A | * | 3/1995 | Segatta et al. ......... 152/209.1 |
| 5,462,979 | A | * | 10/1995 | Sandstrom ............ 523/438 |
| 5,475,051 | A | * | 12/1995 | Machurat ............. 524/519 |
| 5,871,597 | A | | 2/1999 | Vasseur et al. |
| 6,268,424 | B1 | | 7/2001 | Blume et al. |
| 2002/0042479 | A1 | * | 4/2002 | Nanni et al. ........... 525/355 |
| 2002/0169248 | A1 | | 11/2002 | Esch et al. |
| 2003/0082090 | A1 | | 5/2003 | Blume et al. |
| 2004/0226643 | A1 | * | 11/2004 | Yagi et al. ............ 152/510 |

FOREIGN PATENT DOCUMENTS

| CN | 1085228 A | | 4/1994 |
| JP | 7-82418 A | | 3/1995 |
| JP | 07082418 A | * | 3/1995 |
| JP | 07082420 A | * | 3/1995 |
| JP | 7-149955 A | | 6/1995 |
| JP | 2000-34366 A | | 2/2000 |
| JP | 2001-226529 A | | 8/2001 |
| JP | 2004-224963 A | | 8/2004 |
| JP | 2004-339288 A | | 12/2004 |

* cited by examiner

*Primary Examiner*—Vickey Nerangis
(74) *Attorney, Agent, or Firm*—Birch, Stewart, Kolasch & Birch, LLP

(57) ABSTRACT

A rubber composition for an inner liner improving rolling resistance performance of a tire and further improving processability is provided. A rubber composition for an inner liner comprising at least 30 parts by weight of silica having a BET specific surface area of less than 150 $m^2/g$ and at most 5 parts by weight or less of carbon black based on 100 parts by weight of a rubber component comprising a natural rubber and a tire having an inner liner comprising the same.

1 Claim, No Drawings

RUBBER COMPOSITION FOR INNER LINER AND TIRE COMPRISING THE SAME

BACKGROUND OF THE INVENTION

The present invention relates to a rubber composition for an inner liner and a tire comprising thereof.

Butyl rubbers such as a butyl rubber and a chlorinated butyl rubber, carbon black and the like have been conventionally used as the compounding agent of a rubber composition (a rubber composition for an inner liner) used for production of the inner liner of a tire, but recently environmental problems have been taken very seriously, the regulation of suppressing the emission of $CO_2$ is strengthened, and petroleum raw materials are limited and the supply amount is decreased year by year; therefore there is a limitation to use the compounding agent consisting of petroleum resources such as the butyl rubbers and carbon black.

Accordingly, suppose that petroleum are exhausted in the future, it will be necessary to use resources other than petroleum such as a natural rubber and white fillers such as silica and calcium carbonate as the compounding agent of a rubber composition for an inner liner.

However, when a compounding agent obtained from resources other than petroleum is compounded with a rubber composition for an inner liner, viscosity of kneaded products is increased in a kneading step of the rubber composition because silica having higher viscosity than carbon black is compounded and sufficient kneading cannot be carried out; therefore there has been a problem that processability of rubber compositions is lowered. Further, there has been a problem that rolling resistance of a tire having an inner liner comprising the rubber composition is also increased (rolling resistance property is lowered).

It is carried out that a processing aid for silica of surfactants such as a metal salt of fatty acid is compounded together with silica in order to reduce viscosity of kneaded products to improve processability in a kneading step, but since the processing aid is obtained from petroleum resources, there is a fear of being unable to be used in the exhaustion of petroleum.

A rubber composition for an inner liner is disclosed in the Japanese Unexamined Patent Publication No. 2004-339288, but the composition is not a composition wherein compounding silica and a large amount of carbon black is further used; therefore there has been a problem that it cannot be adapted to the exhaustion of petroleum.

SUMMARY OF THE INVENTION

The purpose of the present invention is to provide a rubber composition for an inner liner improving rolling resistance performance of a tire and further improving processability and a tire having an inner liner comprising the same.

The present invention relates to a rubber composition for an inner liner comprising at least 30 parts by weight of silica having a BET specific surface area of less than 150 $m^2/g$ and at most 5 parts by weight of carbon black based on 100 parts by weight of a rubber component comprising a natural rubber.

Further, the present invention relates to a tire having an inner liner comprising the rubber composition for an inner liner.

According to the present invention, a rubber composition for an inner liner improved rolling resistance performance of a tire and processability and a tire having an inner liner comprising the same can be obtained, by containing a rubber component comprising a natural rubber, silica having a low BET specific surface area and carbon black.

DETAILED DESCRIPTION

The rubber composition for an inner liner of the present invention comprises a rubber component, silica and carbon black.

The rubber component comprises a natural rubber. In addition to the natural rubber (NR), the natural rubber in the present invention also includes a modified natural rubber obtained by modifying NR. The modified natural rubber includes an epoxidized natural rubber (ENR), a hydrogenated natural rubber and the like.

ENR is produced by adding an epoxidation agent such as per acetic acid in an emulsion of a natural rubber to be reacted. ENR used in the present invention is not specifically limited, but specifically includes ENR in which an epoxidation rate is 25% (ENR25) and 50% (ENR50), and the like. Additionally, ENR having a different epoxidation rate can be also used. These ENR may be used alone or in a combination of at least two kinds.

The content ratio of the modified natural rubber in the rubber component is preferably 50 to 100% by weight. When the content ratio of the modified natural rubber is less than 50% by weight, air permeability resistance tends to be deficient.

As NR, KR7 and TSR which are generally used in the tire industry can be used.

The content ratio of NR in the rubber component is preferably 0 to 50% by weight. And, when the content ratio of NR exceeds 50% by weight, air permeability resistance tends to be deficient.

As the rubber component of the rubber composition for an inner liner, butyl rubbers which hardly permeate air such as a butyl rubber and a chlorinated butyl rubber are generally used. The butyl rubbers may be also used in the present invention, but since the rubber component consisting of components other than petroleum is tender to environment and can improve rolling resistance performance of a tire and processability of the rubber composition in a balanced manner when it is used in combination with silica having a BET specific surface area of less than 150 $m^2/g$; therefore the rubber component of the present invention comprising a natural rubber, not the butyl rubbers. In particular, the rubber component preferably comprises NR and/or a modified natural rubber, more preferably NR and/or ENR and further preferably NR and ENR.

The BET specific surface area of silica is less than 150 $m^2/g$ and preferably at most 130 $m^2/g$. When the BET specific surface area is 150 $m^2/g$ or more, processability of the rubber composition is deteriorated and rolling resistance performance is insufficient.

The content of silica is at least 30 parts by weight based on 100 parts by weight of the rubber components. When the content of silica is less than 30 parts by weight, rubber strength of the obtained rubber composition is inadequate. Further, the content of silica is preferably 70 parts by weight or less and more preferably at most 50 parts by weight. When the content exceeds 70 parts by weight, viscosity is too high; therefore processability tends to be remarkably inferior.

As the carbon black, carbon black of the standard such as N220, N234, N330, N351 and N550 which is generally used in the tire industry can.

The content of carbon black is at most 5 parts by weight based on 100 parts by weight of the rubber components and preferably at most 3 parts by weight. When the content exceeds 5 parts by weight, it is not preferable because the content ratio of petroleum resources in the rubber composition is increased. And, the content of carbon black is preferably less than 3 parts by weight or less.

In the rubber composition for an inner liner of the present invention, a silane coupling agent can be used in a combination with silica. The silane coupling agent is not specifically limited, but specific examples include sulfides series such as bis(3-triethoxysilylpropyl)tetrasulfide, bis(2-triethoxysilylethyl)tetrasulfide, bis(3-trimethoxysilylpropyl)tetrasulfide, bis(2-trimethoxysilylethyl) tetrasulfide, bis(3-triethoxysilylpropyl)trisulfide, bis(3-trimethoxysilylpropyl)trisulfide, bis(3-triethoxysilylpropyl)disulfide, bis(3-trimethoxysilylpropyl)disulfide, 3-trimethoxysilylpropyl-N,N-dimethylthiocarbamoyltetrasulfide, 3-triethoxysilylpropyl-N,N-dimethylthiocarbamoyltetrasulfide, 2-triethoxysilylethyl-N,N-dimethylthiocarbamoyltetrasulfide, 2-trimethoxysilylethyl-N,N-dimethylthiocarbamoyltetrasulfide, 3-trimethoxysilylpropylbenzothiazolyltetrasulfide, 3-triethoxysilylpropylbenzothiazoltetrasulfide, 3-triethoxysilylpropyl methacrylate monosulfide and 3-trimethoxysilylpropyl methacrylate monosulfide; mercapto series such as 3-mercaptopropyltrimethoxysilane, 3-mercaptopropyltriethoxysilane, 2-mercaptoethyltrimethoxysilane and 2-mercaptoethyltriethoxysilane; vinyl series such as vinyl triethoxysilane and vinyl trimethoxysilane; amino series such as 3-aminopropyltriethoxysilane, 3-aminopropyltrimethoxysilane, 3-(2-aminoethyl)aminopropyltriethoxysilane, and 3-(2-aminoethyl)aminopropyltrimethoxysilane; glycidoxy series such as γ-glycidoxypropyltriethoxysilane, γ-glycidoxypropyltrimethoxysilane, γ-glycidoxypropylmethyldiethoxysilane and γ-glycidoxypropylmethyldimethoxysilane; nitro series such as 3-nitropropyltrimethoxysilane and 3-nitropropyltriethoxysilane; chloro series such as 3-chloropropyltrimethoxysilane, 3-chloropropyltriethoxysilane, 2-chloroethyltrimethoxysilane and 2-chloroethyltriethoxysilane, and the like. These silane coupling agents can use alone or in a combination of at least two kinds. Further, the silane coupling agent can be used by a general amount.

In the rubber composition for an inner liner of the present invention, oils can be contained as a softener. As the oil, process oil, vegetable oil and fat or a mixture thereof may be also used.

The process oil includes specifically, paraffin process oils, naphthene process oils, aromatic process oils and the like.

Further, the vegetable oil and fat includes specifically ricinus, cotton seed oil, linseed oil, rapeseed oil, soy bean oil, palm oil, coconut oil, peanut oil, rosin oil, pine oil, pine tar, tall oil, corn oil, rice bran oil, safflower oil, sesame oil, olive oil, sun flower oil, palm kernel oil, camellia oil, jojoba oil, macadamia nut oil, safflower oil, wood oil and the like.

In the rubber composition for an inner liner of the present invention, various additives such as wax, an antioxidant, stearic acid, zinc oxide, a vulcanization accelerator and the like which are usually used in the tire industry can be suitably compounded, if necessary, in addition to the rubber components, silica, carbon black, the silane coupling agent and the softener.

The tire is produced by a usual method using the rubber composition for an inner liner of the present invention. Namely, the rubber composition for an inner liner of the present invention in which the rubber components, silica and carbon black, and the silane coupling agent and the various additives which are compounded if necessary is extruded and molded in match with the shape of the inner liner of a tire member at an uncured stage and molded by a usual method on a tire molding machine to form uncured tires. The tires can be produced by pressuring and heating the uncured tires in a vulcanizer.

The tire is preferably a pneumatic tire such as a tire fore a vehicle.

EXAMPLES

The present invention is specifically illustrated based on Examples, but the present invention is not limited only to these Examples.

Various chemicals used in Examples are described below.
ENR25: Epoxidized natural rubber (an epoxidation rate of 25% by mol) available from Kumpulan Guthrie Berhad (Malaysia)
NR: TSR
Carbon black: SHOBLACK N220, available from SHOWA CABOT K.K.
Silica A: ULTRASIL VN3 available from Degussa (BET specific surface area: 210 $m^2/g$)
Silica B: ULTRASIL VN2 available from Degussa (BET specific surface area: 125 $m^2/g$)
Silane coupling agent: Si75 available from Degussa
Antioxidant: NOCRAC 6C (N-(1,3-dimethylbutyl)-N'-phenyl-p-phenylenediamine) available from OUCHISHINKO CHEMICAL INDUSTRIAL CO., LTD.
Stearic acid: Stearic acid available from NOF CORPORATION Zinc oxide: Zinc oxide No. 1 available from Mitsui Mining and Smelting Co., Ltd.
Sulfur: Sulfur Powder available from Tsurumi Chemical Industry Co., Ltd.
Vulcanization accelerator: NOCCELER NS available from OUCHISHINKO CHEMICAL INDUSTRIAL CO., LTD.

Examples 1 to 2 and Comparative Example 1

(Preparation of Uncured Rubber)

After the above various chemicals which were described in Table 1 except for sulfur and the vulcanization accelerator were kneaded with 1.7 L Banbury mixer made by Kobe Steel, Ltd. at 120° C. for 3 minutes, then sulfur and the vulcanization accelerator were added and kneaded at 90° C. for 2 minutes with an open roll to obtain uncured rubbers. The obtained uncured rubbers were used for following measurements.

<Mooney Viscosity Index>

Mooney viscosity (ML1+4) of the uncured rubbers at 130° C. was measured in accordance with JIS K6300. The inverse number of the obtained Mooney viscosity was calculated. The value of the inverse number of Mooney viscosity of Comparative Example 1 was referred to as a basis (100) and the value of the inverse number was respectively represented by index. The larger Mooney viscosity index is, the lower Mooney viscosity is, and it is indicated that the processing of the rubber composition is easy and processability is superior.

<Processability of Uncured Rubber Sheet>

An uncured sheet with a thickness of 1.0 mm was extruded with a roll using the uncured rubbers and the state of the cloth of the uncured rubber sheet was visually observed. Those generating no chip and further having no problem in the cloth flesh were represented as ○ and those which were not so were represented as x.

(Production of Pneumatic Tire)

Pneumatic tires (tire size: 195/65/215) were produced by molding the uncured rubber in the shape of an inner liner and pasting with other tire member and then curing under the condition of 150° C. and 30 min.

<Rolling Resistance Index>

Test pieces were cut from the inner liner of the above obtained tire and tan δ of the test pieces were measured under the condition of a dynamic strain amplitude of ±1%, a frequency of 10 Hz and a temperature of 60° C. using a spectrometer made by Ueshima Seisakusho Co., Ltd. The inverse number of the obtained tan δ value was calculated. Tan δ value of Comparative Example 1 was referred to as 100 and the inverse numbers of tan δ value were respectively represented by index. The larger rolling resistance index is, the lower rolling resistance is reduced, and it is indicated that rolling resistance property is superior.

The results of the measurement are shown in Table 1.

TABLE 1

|  | Ex. | | Com. Ex. |
| --- | --- | --- | --- |
|  | 1 | 2 | 1 |
| Amount (parts by weight) | | | |
| ENR25 | 100 | 80 | 100 |
| NR | — | 20 | — |
| Carbon black | 2 | 2 | 2 |
| Silica A | — | — | 40 |
| Silica B | 40 | 40 | — |
| Silane coupling agent | 3.2 | 3.2 | 3.2 |
| Antioxidant | 1 | 1 | 1 |
| Stearic acid | 1.5 | 1.5 | 1.5 |
| Zinc oxide | 3 | 3 | 3 |
| Sulfur | 1.5 | 1.5 | 1.5 |
| Vulcanization accelerator | 2.0 | 2.0 | 2.0 |

TABLE 1-continued

|  | Ex. | | Com. Ex. |
| --- | --- | --- | --- |
|  | 1 | 2 | 1 |
| Result | | | |
| Mooney viscosity index | 115 | 115 | 100 |
| Processability of uncured rubber sheet | ○ | ○ | X |
| Rolling resistance index | 110 | 115 | 100 |

In Example 1, Mooney viscosity is lowered, processability is improved and rolling resistance is reduced by compounding silica having a low specific surface area into the rubber composition.

It is grasped in Example 2 that rolling resistance is further reduced compared with the result of Example 1 without increasing Mooney viscosity, by compounding silica having a low specific surface area and using an epoxidized natural rubber and NR as the rubber component.

What is claimed is:

1. A tire having an inner liner, said inner liner comprising a rubber composition containing 30 to 50 parts by weight of silica having a BET specific surface area of at most 130 $m^2/g$ and 2 to 3 parts by weight of carbon black based on 100 parts by weight of a rubber component,
    wherein the content ratio of an epoxidized natural rubber in said rubber component is 80 to 100% by weight and the content ratio of natural rubber in said rubber component is 0 to 20% by weight.

* * * * *